(12) United States Patent
Takeuchi et al.

(10) Patent No.: US 7,386,597 B2
(45) Date of Patent: Jun. 10, 2008

(54) CONTENTS DISTRIBUTING METHOD AND DISTRIBUTING SYSTEM

(75) Inventors: Tadashi Takeuchi, Yokohama (JP); Ken Nomura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 545 days.

(21) Appl. No.: 10/118,083

(22) Filed: Apr. 9, 2002

(65) Prior Publication Data
US 2003/0233281 A1 Dec. 18, 2003

(30) Foreign Application Priority Data
Mar. 20, 2002 (JP) .............................. 2002-077650

(51) Int. Cl.
*G06F 15/167* (2006.01)
(52) U.S. Cl. ..................... 709/216; 709/217; 709/218; 709/219; 705/26
(58) Field of Classification Search ............... 709/203, 709/216–219, 223, 238, 245; 370/351, 360; 705/26
See application file for complete search history.

(56) References Cited

U.S. PATENT DOCUMENTS

| | | | | |
|---|---|---|---|---|
| 5,634,012 A * | 5/1997 | Stefik et al. ................... | 705/39 |
| 6,134,588 A * | 10/2000 | Guenthner et al. ......... | 709/226 |
| 6,192,408 B1 * | 2/2001 | Vahalia et al. .............. | 709/229 |
| 6,314,465 B1 * | 11/2001 | Paul et al. .................. | 709/226 |
| 6,412,008 B1 * | 6/2002 | Fields et al. ................ | 709/228 |
| 6,516,351 B2 * | 2/2003 | Borr ........................... | 709/229 |
| 6,564,252 B1 * | 5/2003 | Hickman et al. ........... | 709/214 |
| 6,622,220 B2 * | 9/2003 | Yoshida et al. ............. | 711/152 |
| 6,697,846 B1 * | 2/2004 | Soltis ......................... | 709/217 |
| 6,718,372 B1 * | 4/2004 | Bober ......................... | 709/217 |
| 6,735,741 B1 * | 5/2004 | Pannu ......................... | 715/530 |
| 6,757,684 B2 * | 6/2004 | Svendsen et al. ............. | 707/10 |
| 6,772,209 B1 * | 8/2004 | Chernock et al. ........... | 709/225 |
| 6,826,598 B1 * | 11/2004 | Titmuss et al. ............. | 709/212 |

FOREIGN PATENT DOCUMENTS

| | | |
|---|---|---|
| JP | 11-53322 | 2/1999 |
| JP | 2000-092236 | 3/2000 |

OTHER PUBLICATIONS

Stretching the Fabric of the Net: Examining the Present and Potential of Peer-to-Peer Technologies, "SIIA Peer-to-Peer Whitepaper", 2001, pp. 2-13.
Internet Magazine Jan. 2001, pp. 234-235.
PCJapan Magazine, article on p. 180 w/English translation.

* cited by examiner

*Primary Examiner*—Saleh Najjar
*Assistant Examiner*—Faruk Hamza
(74) *Attorney, Agent, or Firm*—Mattingly, Stanger, Malur & Brundidge, P.C.

(57) ABSTRACT

According to the present invention, there are disclosed a contents distributing method and a system which permits distribution of contents held by the client to the other clients, irrespective of the operating status of the client, and allows certain billing. In this system, a plurality of storage servers storing contents held by the individual clients are arranged on a network. The client issues a contents distributing request to the corresponding storage server, and acquires the contents. The storage server inquires, when the requested contents are not held, the retrieving server, and collects the contents from the other servers holding the contents. The storage server sends a billing requests, together with the billing information, to the service use fee billing server and the contents use fee billing server.

10 Claims, 16 Drawing Sheets

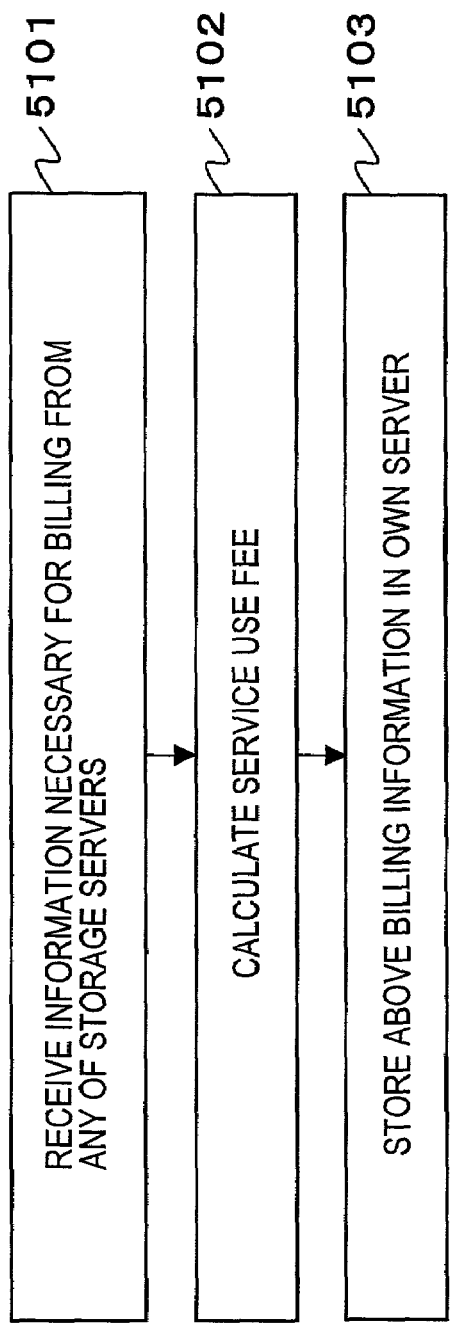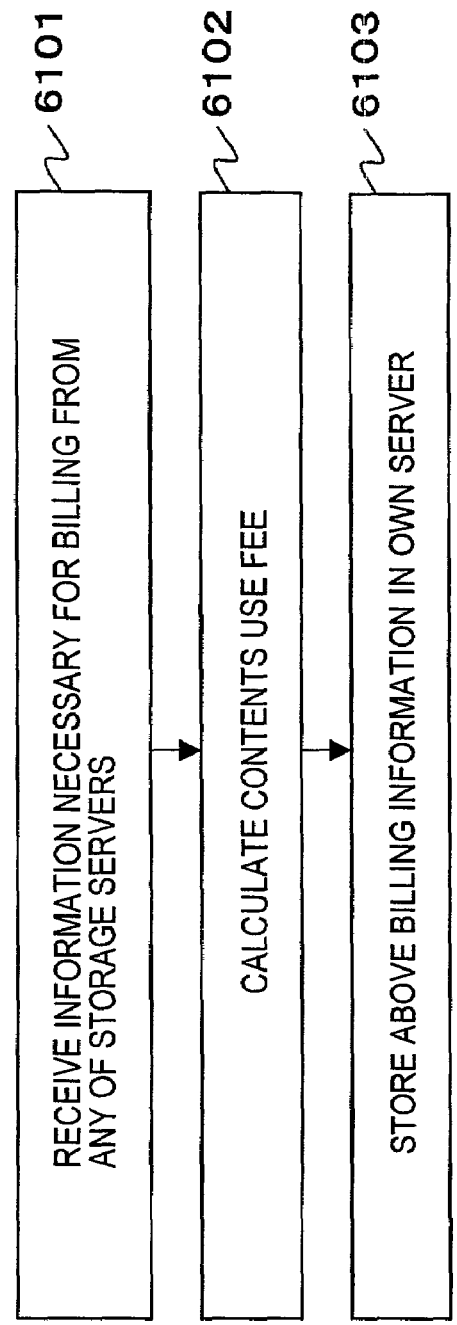
FIG.11A
FIG.11B ively, the invention relates to a method for distributing
CONTENTS DISTRIBUTING METHOD AND DISTRIBUTING SYSTEM

BACKGROUND OF THE INVENTION

1. Field of the Invention

The present invention relates to a method for distributing contents and a system for use in such a method. More particularly, the invention relates to a method for distributing contents by use of storage unit, and a system used in such a method.

2. Description of the Related Art

As a system distributing contents used via a network, Hybrid P2P system ("Internet Magazine", Impress Publishing Co., January 2001, pp. 234-235) is known. The Hybrid P2P (HP2P) System is described as follows in the column "Features of S/C System and P2P System", on page 235 of this magazine. "In many cases, information to be shared is located at clients, and servers manage only the location of information. Information is exchanged one to one in a redirected form from the result of retrieval of the servers. This may be called a 'pseudo-S/C system', and user authentication by a server is possible. The protocol stack on TCP/IP is unique to each service, and is characterized by an aperiodic update of information. While the server regulates the service player, the information self-reproduces".

Such a system comprises a plurality of client (client computers) and a server. At a point in time of turn-on at a client, the client transmits a list of kinds of data (contents) held by the client to the server. Upon turn-off of power, each client notifies the server of the intention to turn off power. The server manages the list of clients currently holding data of various kinds with reference to inspection of the kind of transmitted data.

When a client is to receive data of a particular kind from another client, steps to be taken are as follows. First, the client wishing to receive data inquires the server from which client the data should be received. This inquiry is accomplished in the following procedure:

(1) The client wishing to receive data transmits the information which specifies the data to be received to the server.

(2) The server selects a client the closest to the client wishing to receive data from among the list of clients holding the data specified by the above-mentioned specifying information. Information showing the thus selected client is notified to the client wishing to receive data.

Then, the client wishing to receive data issues a data transmitting request to the client notified in (2) above. As a result, it is possible to receive data of the specified kind from the client having received the notice in (2) above.

An example of contents distribution by use of such a P2P (peer-to-peer) system is reported in (SIIA PEER-TO-PEER WHITE PAPER, published by Software & Information Industry Association).

The aforementioned distributing method has various problems regarding the system framework itself in that a client holds data, and the client transmits data to the requesting client.

A first problem is that clients selectable as data transmitting locations are limited to clients of which power is turned on. That is, clients of which power is currently turned off cannot be selected as a transmitting client. For example, even though there is a client the closest to the client requesting transmission of data (requesting client), holding the requested data, if it is in turn-off state of power, the data would be transmitted from another client holding the same data. In this case, the network distance between the clients exchanging the data may be longer. As a result, the total amount of the network band consumed upon data exchange becomes larger.

A second problem relates to billing. When distributing data, in general, a service use fee and a data use fee (contents use fee) are charged for data distribution. In the above-mentioned data distributing method, however, billing is not easy. In order to carry out billing, it is necessary, after conducting data transmission and receiving on the client side, to transmit an execution completion notice of data receipt from the client to the billing server. This transmission is however performed by an application which receives data, operating on the client. As a result, an easy avoidance of billing becomes possible by using means such as manipulation of the application.

SUMMARY OF THE INVENTION

Accordingly, it is an object of the present invention to provide a technique for distributing contents held by a client without increasing the total amount of network band, irrespective of the operating status of the client.

Another object of the invention is to provide a technique for achieving contents distribution which reliably enables a billing of such fees as the service use fee and the contents use fee for data distribution.

To achieve the above-mentioned objects, in the present invention, there is built a system in which a plurality of client and a plurality of storage server having storage unit are connected via a network. Each storage unit in this system store contents for each clients allocated thereto.

Upon receipt of a contents distributing request from a client, each storage server acquires the contents specified in the request from another storage server via a network. The storage server stores the acquired contents in the own storage unit as data for the request transmitting client. The storage server transmits the acquired data to the client having transmitted the data transmitting request.

Upon executing the above-mentioned data acquisition, each storage server transmits a billing request to the server managing the fees such as the service use fee and the data use fee (contents use fee).

BRIEF DESCRIPTION OF THE DRAWINGS

FIG. 11A is a flowchart illustrating the operating procedure of the service use fee billing server; FIG. 11B is a flowchart illustrating the operating procedure of the contents use fee billing server;

DESCRIPTION OF THE PREFERRED EMBODIMENTS

Embodiments of the present invention will now be described with reference to the drawings. The present invention is not limited to the embodiments described in the following paragraphs.

A first embodiment of the present invention will be described with reference to FIGS. 1 to 11. First, an outline of the contents distributing business achieved by the first embodiment will be described. In this embodiment, servers having storage units, i.e., a plurality of storage servers are arranged. These storage servers are connected via a network, and mutually exchange data by use of P2P. One or more information processing units serving as client computers (in this specification, simply referred to as "clients") are correlated to the individual storage servers, as an object to which a service is to be provided. A client makes an access to each correlated storage server via the network.

In the system of this embodiment, there is arranged a server having an information processing unit performing processing for managing location of contents held by various servers within the system, i.e., a retrieving server. This retrieving server manages location of the contents held by the individual storage servers, and provides a service of providing information showing location of the contents.

An origin server for supplying contents is arranged in the system of this embodiment. The origin server distributes, in response to the request of the individual storage servers, the requested contents to the requesting storage server. The origin server collects various contents from any of various contents sources. For the contents held by the origin server also, the above-mentioned retrieving server manages the location thereof.

In this embodiment, each client serves as an user of the contents in the system. Each client itself may however serve as a provider of contents. In this case, for example, it provides the above-mentioned origin server with contents. It is also possible to make own contents available to other clients by causing a corresponding storage server to hold such contents.

Figure 1:
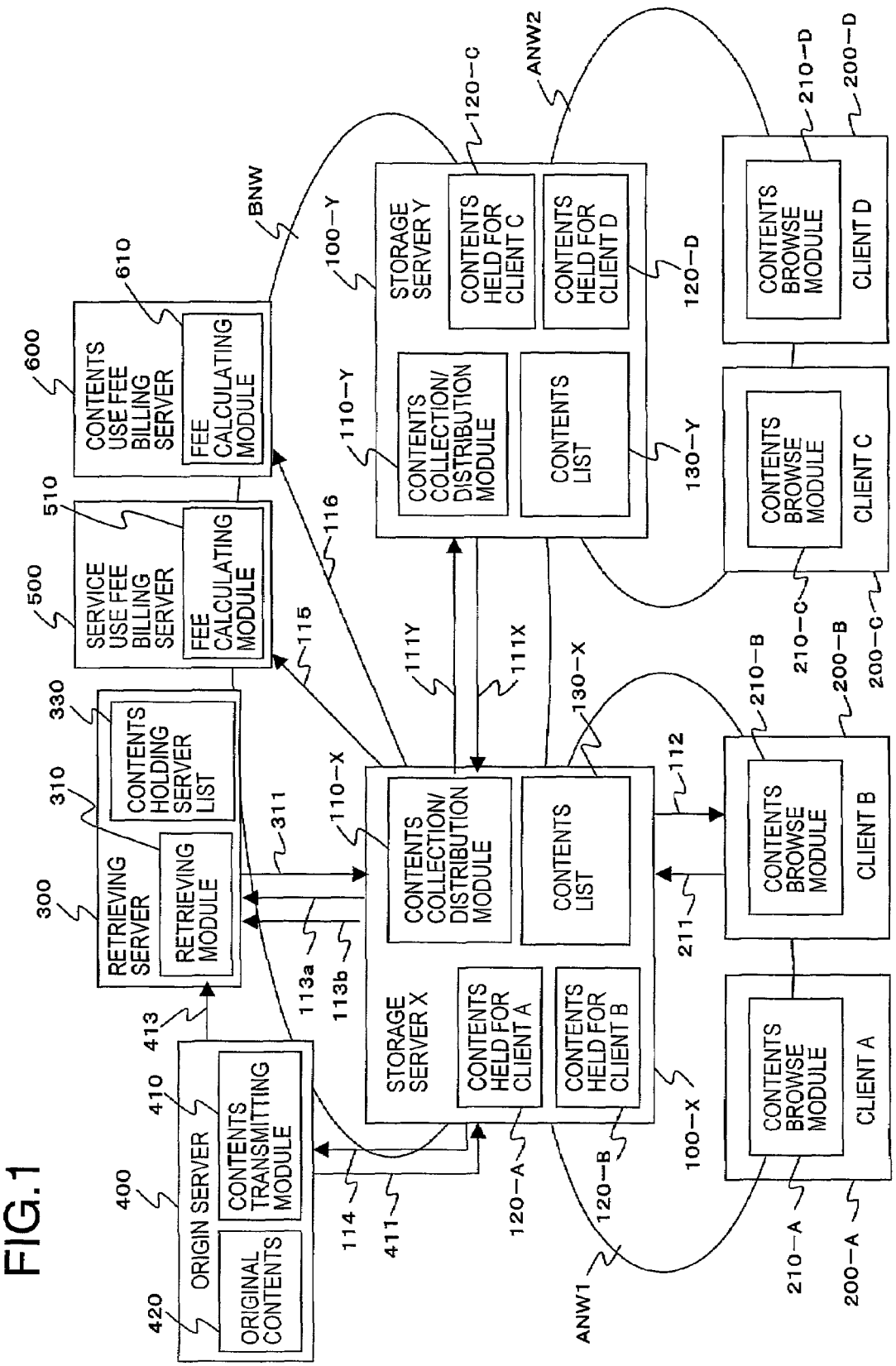
FIG. 1 is a block diagram illustrating a schematic configuration of the system assuming a contents distribution in a first embodiment of the present invention.

FIG. 1 illustrates an outline of the configuration of the system used for achieving business of distributing the above-mentioned contents.

This system comprises storage servers 100 (100-X, 100-Y, . . . ), clients 200 (200-A, 200-B, 200-C, 200-D, . . . ), a retrieving server 300, an origin server 400, a service use fee billing server 500, and a contents use fee billing server 600. In the drawings, when there are a plurality of units of the same kind as the storage servers 100-X and 100-Y, the clients 200-A, 200-B, 200-C and 200-D, subscripts such as -X, -Y, -A, and -B are added thereto. These subscripts are added to discriminate operations of similar units. In the description in the specification, therefore, no subscripts are added when it is not necessary to make a particular discrimination.

In FIG. 1, two storage servers 100-X and 100-Y are illustrated as storage servers 100. The number of storage server is not of course limited to two. Actually, more storage servers are arranged. Clients 200-A, 200-B, . . . to receive services are allocated to the individual storage servers 100-X and 100-Y. In this embodiment, communication is carried out between the storage server 100-X and the clients 200-A and 200-B via an access network ANW1. Communication is made between the storage server 100-Y and the clients 200-C and 200-D via an access network ANW2. On the other hand, the storage servers 100-X and 100-Y, the retrieving server 300, the origin server 400, the service use fee billing server 500, and the contents use fee billing server 600 are connected by a backbone network BNW, capable of performing communication of a large volume of data at a high speed.

The storage server 100, the client 200, the retrieving server 300, the origin server 400, the service use fee billing server 500, and the contents use fee billing server 600 are provided with information processing units, respectively. These information processing units can basically be composed of similar hardware elements. However, the performance and the scale of constituent elements of the system differ in response to the scale and use of clients and servers. Hardware elements are added as required.

Figure 2:
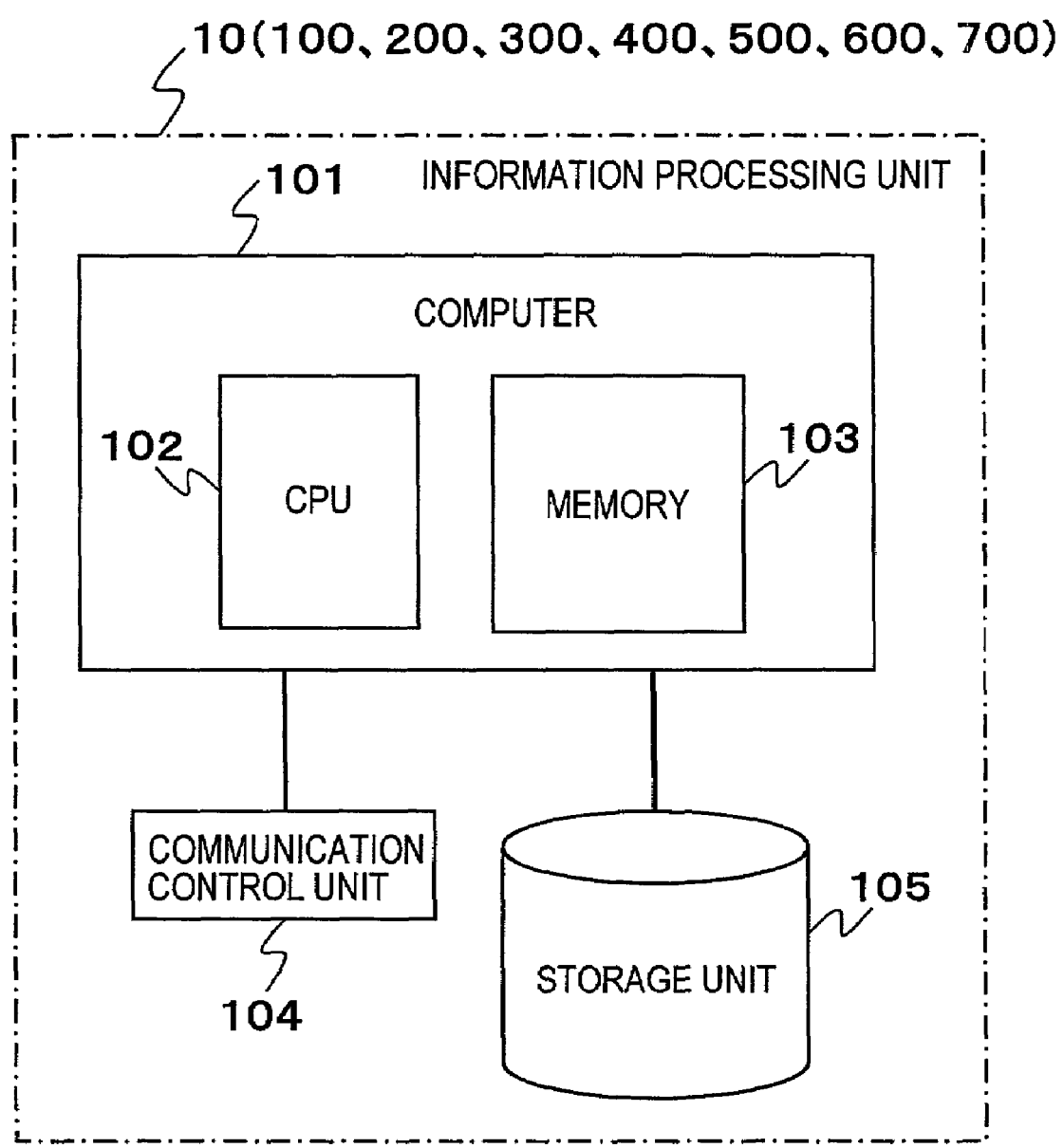
FIG. 2 is a block diagram illustrating an example of hardware system configuration of the information processing unit constituting the servers used in this embodiment.

FIG. 2 illustrates an example of the hardware system composing server such as the storage server. As shown in FIG. 2, the information processing unit 10 has a computer 101, a communication control unit 104 and a storage unit 105. In addition, a display unit and an input unit can be provided, although not shown in FIG. 2.

The computer 101 comprises a central processing unit (CPU) 102 and a memory 103. The computer 101 achieves various functions of this embodiment through execution by the CPU 102 of programs loaded onto the memory 103. In the case of the storage server 100, the computer 101 performs various functions regarding contents such as acquisition, holding, managing, transmission, distribution and transmission of billing information. Programs for these processes and data are installed in the storage unit 105, together with programs such as an operating system. These programs are provided by the program provider in a state recorded in a recording medium such as a CD-ROM. It is also possible for a program provider to provide these programs via the network.

The origin server 400 comprises an information processing unit 10 as shown in FIG. 2. The origin server 400 has, as shown in FIG. 1, a contents transmitting module 410 executed by a computer 101, a memory 103 and original contents 420 stored in the storage unit 105.

The origin server 400 holds contents provided by a contents provider as original contents 420. The origin server 400 receives a contents acquiring request from any of the storage servers 100 by means of the contents transmitting module 410, reads out the requested contents from the original contents 420, and transmits the same.

Each client 200 is composed by using an information processing unit 10 as shown in FIG. 2. Although not shown, the client 200 has a display unit and an input unit. An audio reproducing unit should preferably be connected or built in. That is, functions necessary for reproduction of the distributed contents are provided.

The client 200 has a contents browse module 210 executed by the computer 101 as shown in FIG. 1. A program for achieving this contents browse module 210 is stored in the memory 103 and the storage unit 105, and executed by the CPU 102. The contents browse module 210 transmits and receives a contents distributing request 211 and a contents distribution 112 with the contents collection/distribution module 110. As a result, the client 200 can receive the requested contents from the storage server 100, and display the same on the display unit.

Each client 200 holds contents for the own client (copy of the original contents) in the storage server 100 as contents (120-A, 120-B, 120-C and 120-D) held for the client A (B, C or D). As a result, storage servers 100 are previously correlated to the individual clients 200 respectively to be accessed thereby. Corresponding IP address of the storage server 100 is notified to each client 200. Therefore, each client 200 holds the IP address of the storage server holding the contents for the own client. When accessing the storage server 100, therefore, the contents browse module 210 reads out the IP address thereof.

The retrieving server 300 is composed of an information processing unit 10 as shown in FIG. 2. The retrieving server 300 has, as shown in FIG. 1, a retrieving module 310 executed by the computer 101, and a contents holding server list 330 stored in the memory 103 and the storage unit 105.

On the retrieving server 300, the retrieving module 310 operates. The retrieving module 310 manages original contents 420 held by the origin server 400, and contents (120-A, 120-B, 120-C and 120-D) held for the client A (B, C or D) stored by the storage servers 100-X and 100-Y, by means of the contents holding server list 330. Location management of these contents is accomplished by receiving an update notice of contents held 413 from the origin server 400, and a contents information notice 113b from the individual storage servers 100. When receiving a contents retrieving request 113a from any of the storage servers 100-X, it transmits the list of servers holding the requested contents (origin server 400, or any other storage server 100-Y) as a retrieval result notice 311 to the request transmitting storage server 100. Upon receipt of this notice, the storage server 100-X determines a server which is to acquire the contents by use of P2P on the basis of this list.

Figure 9:
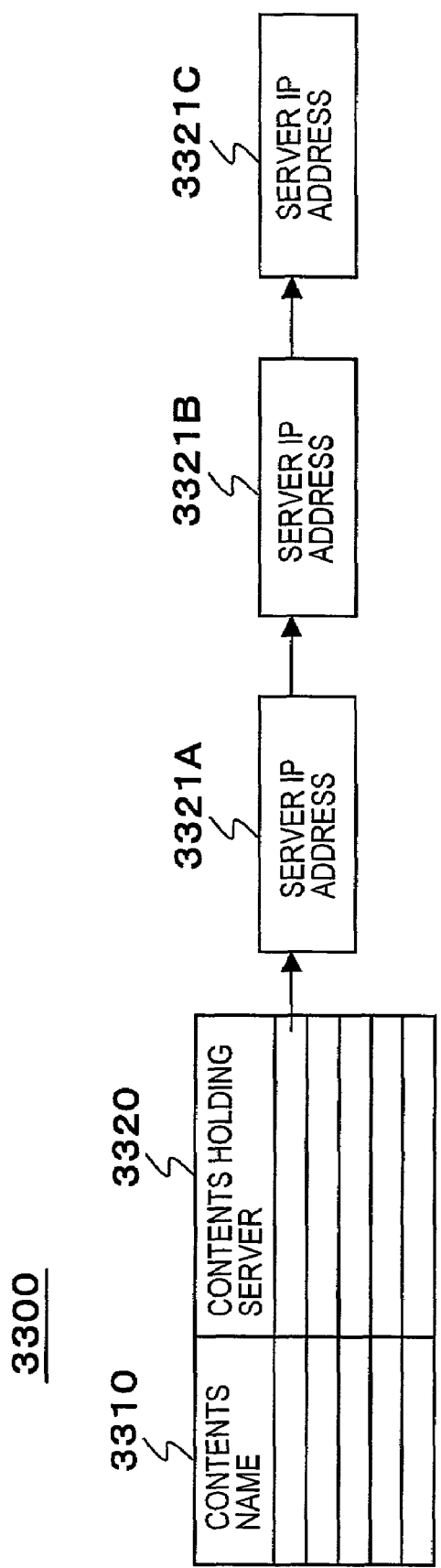
FIG. 9 is a descriptive view illustrating the data structure of the list of servers holding contents used when retrieving the location of contents by the retrieving module, provided in the retrieving server.

The contents holding server list 330 is data used by the retrieving module 310 for performing location manage regarding the contents (120-A, 120-B, 120-C and 120-D) held for the client A (B, C or D) stored in the individual servers 100, and the original contents 420 held by the origin server 400. FIG. 9 illustrates an example of the data structure thereof.

As shown in FIG. 9, the contents holding server list 330 has a field (contents name) for specifying contents, a field (contents holding server) for specifying IP address of the servers storing contents. When a plurality of server holds the same contents, each server sequentially stores the IP addresses such as 3321A, 3321B and 3321C.

Each storage server 100 has contents collection/distribution module 110 which functions for acquiring the contents. Each storage server 100 also stores contents for clients correlated thereto. For example, the storage server 100-X stores contents 120-A held for the client A, and contents 120-B held for the client B. For another example, the strage server 100-Y stores the contents 120-C held for the client C, and the contents 120-D held for the client D. The storage server 100 has furthermore a contents list 130 for managing as to what contents are held.

Matching of the clients 200-A, 200-B, 200-C and 200-D with the storage servers 100-X and 100-Y is accomplished by selecting a storage server 100 the closest possible to the client, i.e., the closest storage server 100. More specifically, a storage server with the shortest network distance is selected.

The contents provided to the clients 200 include various data such as music, movies, broadcast programs, games and computer programs. There is no particular restriction imposed on the kind of contents. Various data capable of being exchanged via the network are included. The contents held by each storage server is distributed, in response to a request from a client, to the requesting client.

The contents collection/distribution module 110 is executed by the computer 101, and performs acquisition, holding and distribution of contents for providing to the client in the storage server 100. More specifically, the computer 101 conducts the following processing as a contents collection/distribution module:

(1) receiving a contents distributing request from any of the information processing units via the network;

(2) distributing, when the requested contents are stored in the storage unit, such contents to the distribution-requesting information processing unit;

(3) acquiring, when the requested contents are not stored in the storage units, the contents from any other information processing unit via the network;

(4) causing the storage units to store the thus acquired contents; and (5) distributing the thus acquired contents to the requesting information processing unit via the network.

More particularly, when any of the correlated clients issues a distributing request 211 of specific contents, the contents collection/distribution module 110 checks whether or not the requested contents are held with reference to the contents list 130. When the requested contents are held, the contents held are distributed. When the requested contents are not held, on the other hand, the contents are acquired from any other server. The acquired contents are stored in the storage unit 105. Upon completion, the thus acquired contents are distributed to the requesting client 200.

Upon receipt of the contents distributing request 211 from the client 200, the contents collection/distribution module 110 starts operation. The contents collection/distribution module 110 sends a contents retrieving request 113a, and a contents information notice 113b, receives a retrieval result 311 to/from the retrieving module 310 on the retrieving server 300. When the storage server 100 does not hold the contents requested by the client, the contents collection/distribution module 110 transmits a contents retrieving request 113a to the retrieving module 310. Upon receipt of a retrieval result notice 311 from the retrieving module 310, it acquires information showing location of the contents included in the retrieval result notice. Based on this information, it transmits a contents acquiring request to the server storing the required contents. For example, if the server storing the required contents is the storage server 100-Y, contents acquiring request 111Y is transmitted to the contents collection/distribution module 110-Y. If the server storing the required contents is the origin server 400, contents acquiring request 114 is transmitted to the contents transmitting module 410.

As a result of such processing, the contents collection/distribution module 110-X executes acquisition of the contents using P2P with the storage server 100-Y, or the origin server 400. The thus acquired contents are stored as the contents 120-A held for the client A (B, C or D). Subsequently, the acquired contents are distributed to the client 200-A issuing the contents distributing request 211.

As billing of the service use fee and the contents use fee resulting from the contents distribution, billing requests 115 and 116 are transmitted to the service use fee billing server 500 and the contents use fee billing server 600. These billing requests 115 and 116 comprise billing information including a set of:

Contents name;
Name of a client having issued a distributing request of the contents;
Distributing time of the requested contents; and
Name of contents provider.

Figure 8:
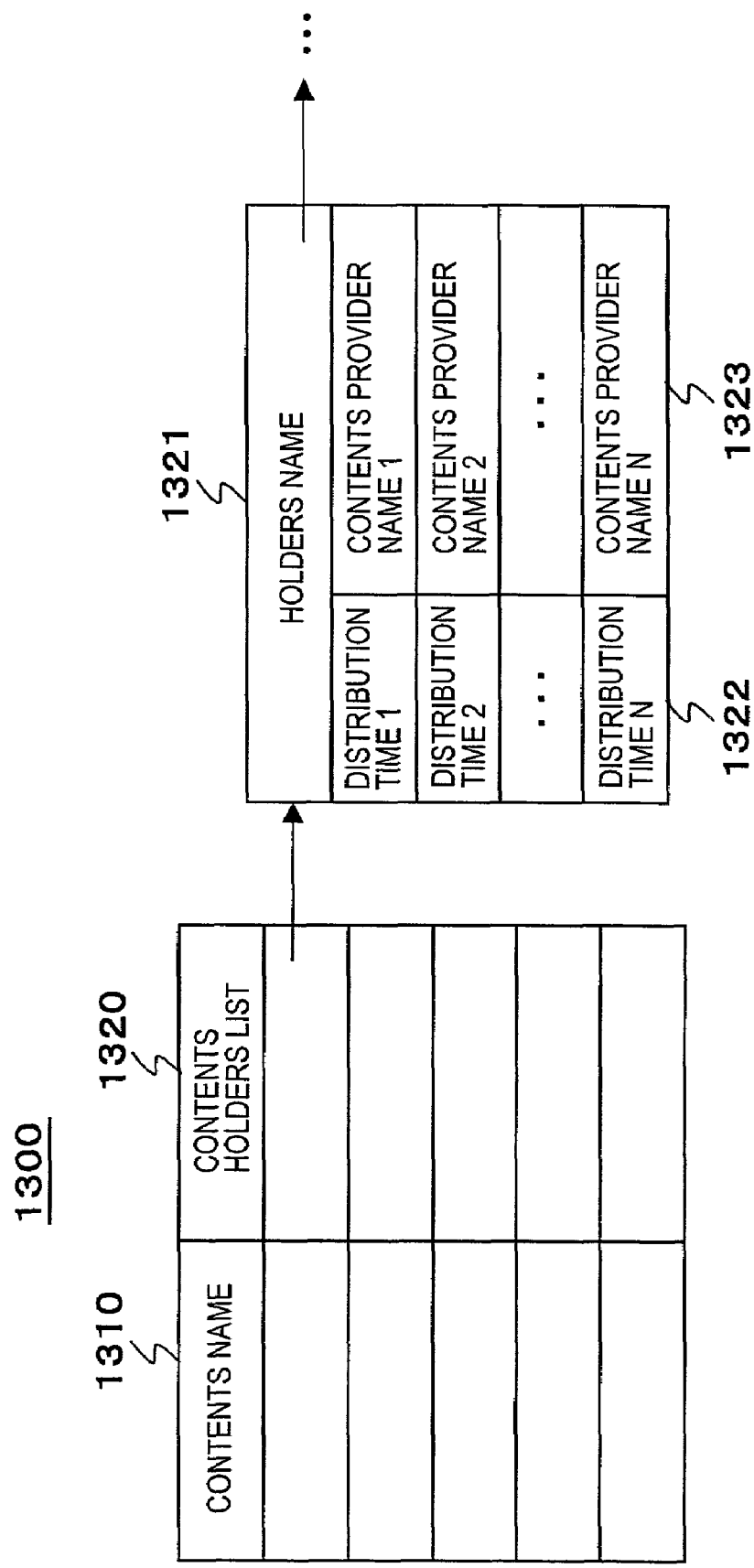
FIG. 8 is a descriptive view illustrating an example of the data structure of the list of contents held, showing a list of contents held by the storage servers.

A contents list 130 shown in FIG. 8 may be used as this information. For the purpose of transmitting the above-mentioned information, therefore, the contents collection/distribution module 110 retains this information in the storage unit 105 in the own server upon every update of the contents list 130 of contents held.

The billing requests 115 and 116 are transmitted upon every distribution of the contents. The contents collection/distribution module 110 may periodically transmit billing requests 115 and 116 to the service use fee billing server 500 and the contents use fee billing server 600.

When acquiring new contents, the contents collection/distribution module 110 notifies the retrieving module 310 of location information of acquired contents as contents information notice 113b.

The contents list 130 is a data for managing the contents held by the own storage servers. FIG. 8 illustrates details of the data structure thereof. As shown in FIG. 8, this data structure comprises a contents table 1300 having a field showing the name of contents (contents name field) 1310, and a field showing the name of a client managed as a holder of said contents (contents holders field) 1320. This contents holders field 1320 includes information showing the history of contents distribution. This information includes a field showing a name of contents holder, e.g. a name of client (holders name field) 1321, a field showing the time of the day when the contents was distributed to the client (distribution time field) 1322, and a field showing the name of a client providing the required contents (name of contents provider field) 1323.

For example, when a storage server 100-X acquires a contents from the client B for the client A, the name of the contents is recorded in the contents name field 1310.

Here, the client A, newly acquired said contents, is recorded in the contents holders field 1320. Also, when the storage server 100-X distributes the contents to the client A, the distribution time 1 is recorded in the distribution time field 1322. Further, corresponding to the distribution time 1, the name of contents provider is recorded in the contents provider field 1323. The contents provider hereby means the original provider of the contents. For example, if the original provider of the contents distributed to the client A is client B, the name of the client B is recorded. For another example, if the contents is acquired from the origin server 400, the name of contents provider who provided the contents to the origin server 400 is recorded.

The service use fee billing server 500 and the contents use fee billing server 600 are composed by use of hardware similar to the servers as shown in FIG. 2. The service use fee billing server 500 mounts a fee calculating module 510 achieved by the computer 101 as shown in FIG. 1. The contents use fee billing server 600 mounts a fee calculating module 610 achieved by the computer 101. Programs for these modules are stored in the storage unit 105. The server use fee billing server 500 and the contents use fee billing server 600 store calculated fees stored in the storage unit 105.

The service use fee for each client is calculated, for example, by multiplying the number of contents distributing requests issued by each client by a unit price of the contents distributing service fee. The contents use fee is calculated, for example, on the basis of the number of purchases of contents by each client, or the number of runs of referencing of the contents. The term the "number of purchases of contents" as herein used means the number of issuances of distributing request for the contents held for the other clients. The term the "number of runs of referencing of contents" means the number of issuances of distributing request for the contents held for the own client. The calculated amounts of fee are accumulated in the servers 500 and 600, respectively, as described above. A bill is issued and dispatched at the end of a certain period, monthly for example, to each client. Payment of fees may be made automatically from a bank account.

The charged amount of fees, in the case of service use fee, is distributed among servers participating in supply of services at a predetermined ratio. This calculation may be accomplished by a calculation module 510 of the service use fee billing server 500. The balance of the contents use fees after subtracting the fees for the servers participating in the supply of services, the storage server 100, the origin server 400, the retrieving server 300, and the contents use fee billing server 600 is paid as compensation to the contents provider. Payment may be made through transfer to a specified bank account. It is needless to mention that payment may be made with an electronic currency independently valid within this system.

Figure 3:
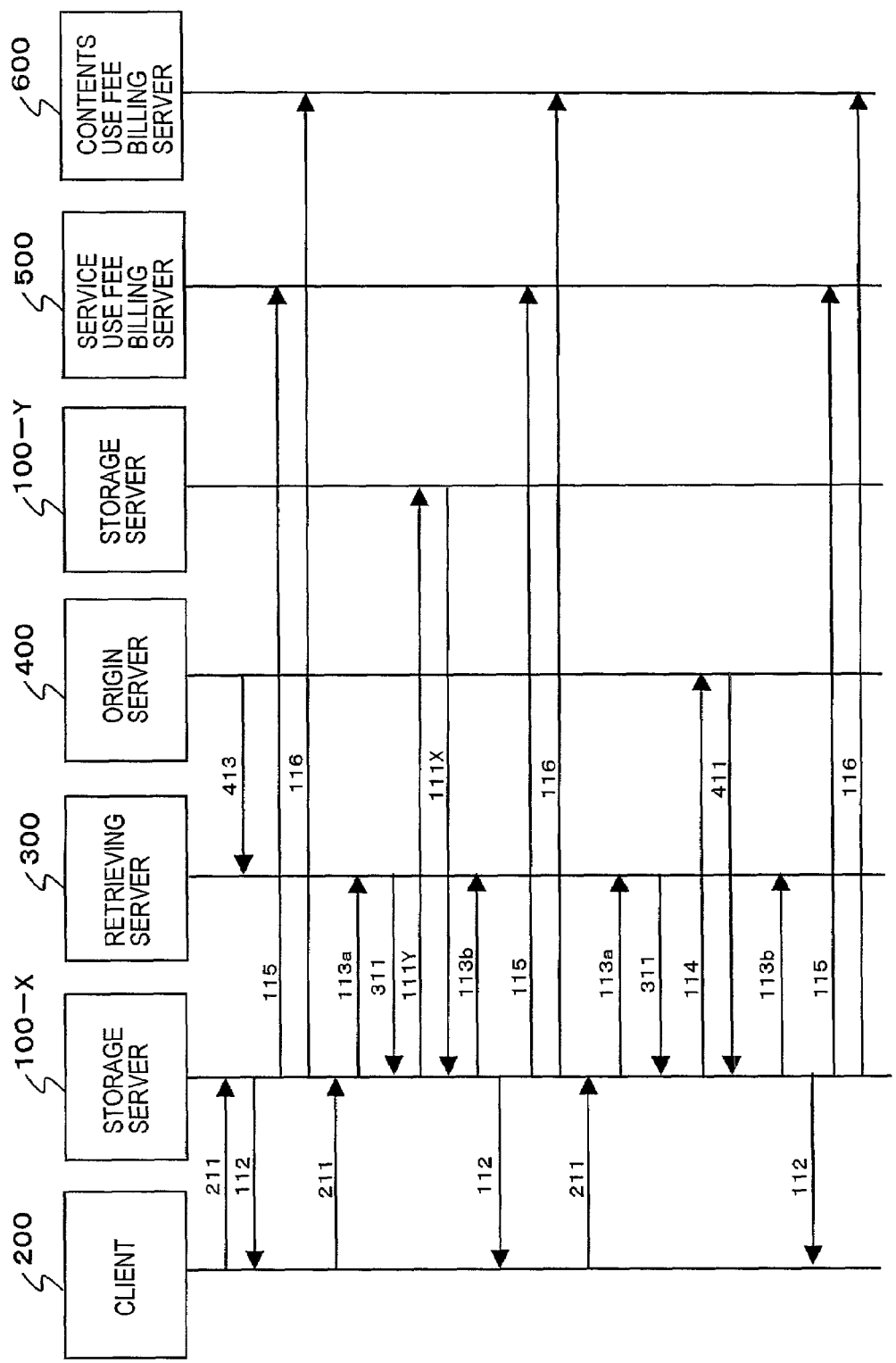
FIG. 3 is a descriptive view illustrating the flow of information in this embodiment.

Cases of management of supply of contents in this embodiment will now be described. FIG. 3 illustrates the flow of information in the system shown in FIG. 1. The symbols attached to the arrows in FIG. 3 correspond to the symbols attached to the arrows in FIG. 1.

Figure 4:
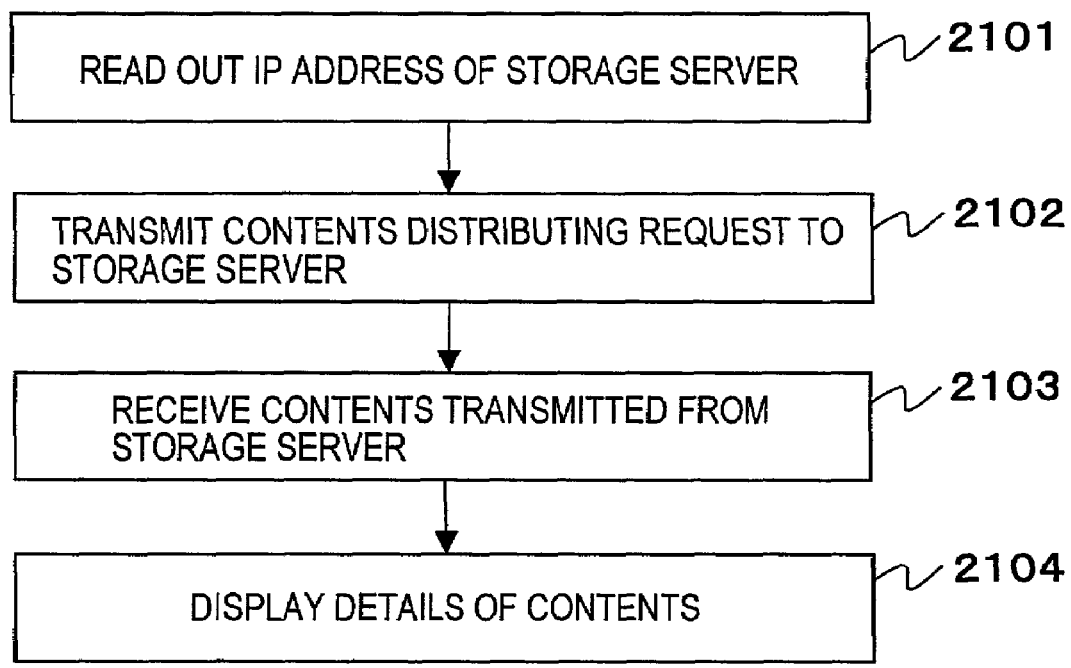
FIG. 4 is a flowchart illustrating the operating procedure of the contents browse module in the first embodiment.

FIG. 4 illustrates the operating procedure of the contents browse module 210 of the client 200. The contents browse module 210 reads out the IP address of the storage server 100 holding the contents for the own client from the storage unit (step 2101). Then, a contents distributing request is transmitted to the storage server 100 having the read IP address (step 2102). At this point in time, information specifying the requested contents is also transmitted. Subsequently, the contents sent from the storage server 100 are received (step 2103). The received contents are reproduced and output on a display unit or the like (step 2104). The flow of information in this case occurs between the client 200 and the storage server 100, as shown in FIGS. 1 and 3.

Then, the operating procedure of a contents transmitting module 410 of the contents origin server 400 will be described. The contents transmitting module 410 operates when registering the original contents 420 and when receiving a contents acquiring request 114 from the storage server 100.

Figure 5:
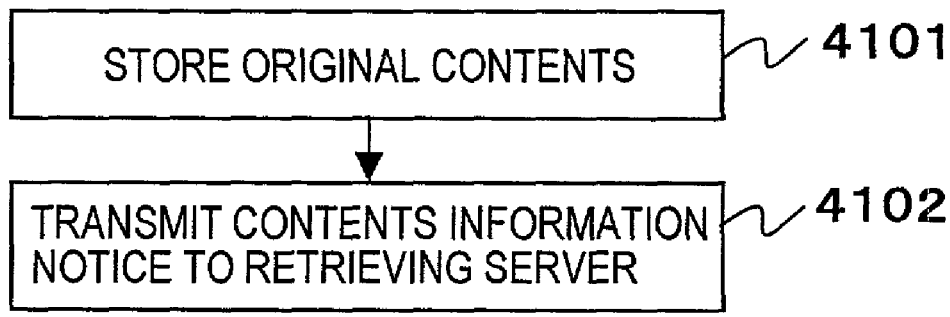
FIG. 5 illustrates storing operation procedure of contents by the contents transmitting module in the origin server.

The operating procedure upon registering the original contents is illustrated in FIG. 5. In FIG. 5, the contents transmitting module 410 acquires the original contents from a contents supply source not shown, and stores the same into the original contents 420 (step 4101). Thereafter, the contents transmitting module 410 transmits contents information notice 413 to the retrieving server 300 (step 4102). This contents information notice 413 includes information of contents name showing contents held anew by the origin server 430.

Figure 6:
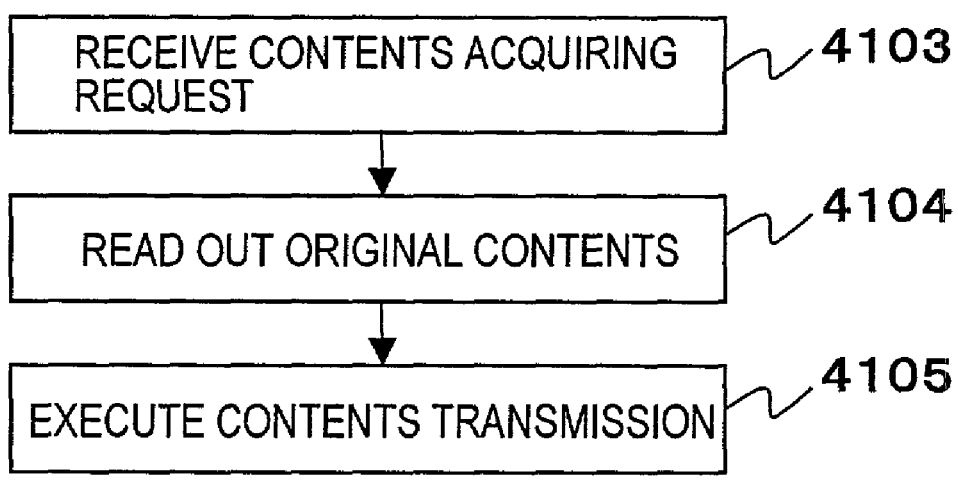
FIG. 6 is a flowchart illustrating the operating procedure of contents distribution by the contents transmitting module.

Then, the operating procedure of the contents transmitting module 410 upon receipt of a contents acquiring request from the storage server will be described. The operating procedure is illustrated in FIG. 6. The contents transmitting module 410 receives the contents acquiring request 114 from the storage server 100 (step 4103). This request contains the contents name of the contents acquired by the storage server. The contents transmitting module 410 reads out the contents from the original contents stored in the storage unit 105 on the own server (step 4104). Then, the contents are transmitted to the storage server 100 having issued the request (step 4105).

Figure 7:
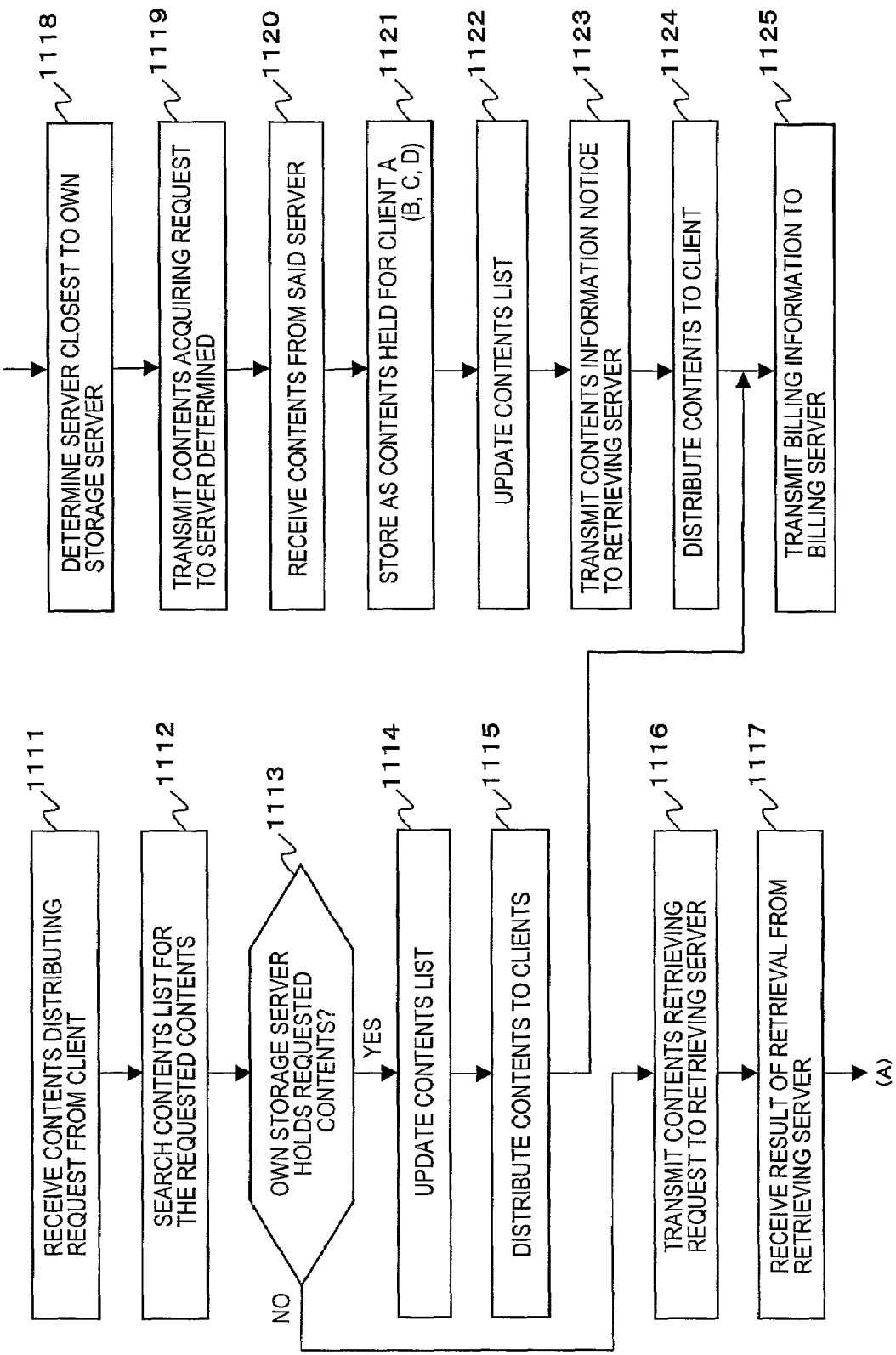
FIG. 7 is a flowchart illustrating the operating procedure of the contents collection/distribution module.

FIG. 7 illustrates the operating procedure of the contents collection/distribution module 110 of the storage server 100. In FIG. 7, the contents collection/distribution module 110 receives a contents distributing request 211 from the client 200 (step 1111). The name of contents of which distribution is requested by the client is specified in this contents distributing request. Upon receipt of this contents distributing request, the contents collection/distribution module 110 starts operation. Then, the contents collection/distribution module 110 retrieves the contents list 130 as to whether or not the own storage server 100 has the requested contents (step 1112). That is, the module 110 retrieves whether or not the received contents name is contained in the contents name field 1310 shown in FIG. 8, thus determining whether or not the own storage server holds the contents requested by the client (step 1113).

When the own storage server holds the contents requested by the client, the contents list 130 is updated (step 1114). That is, the name of contents holder is added to the holders field 1320, or contents distributing time is added to the distribution time field 1322. Subsequently, the contents are transmitted to the requesting client 200 (step 1115). In addition, billing information is sent to the billing servers, that is, the service use fee billing server 500 and the contents use fee billing server 600 (step 1125).

When the own storage server does not hold the contents requested by the client, a contents retrieving request 113a is transmitted to the retrieving server 300. This request includes the specified contents name received in step 1111 (step 1116). Thereafter, a retrieval result notice 311 is received from the retrieving server 300 (step 1117). As a result of receipt of this notice 311, the contents collection/distribution module 110 acquires a list of IP addresses (see FIG. 9) of the storage server 100 holding the specified contents. When a storage server holding the requested contents is not present, however, an IP address of the origin server 400 is acquired.

The contents collection/distribution module 110 determines a server the closest to the own storage server from the list of IP addresses acquired (step 1118). The number of hops from the own edge storage to a server of which IP address is known already, can be known by a method of transmitting an ECHO_REQUEST packet of the ICMP protocol. The closest server can be determined by knowing the number of hops by the above-mentioned method by use of the IP addresses of the individual servers contained in the list of IP addresses.

Then, the contents collection/distribution module 110 transmits the contents acquiring request 111Y to the determined server (1119). The contents name of the contents to be acquired should be contained in this request 111Y.

Then, the contents 111X from the server serving as the destination of the contents acquiring request 111Y (a storage server 110-Y, in this case) is received (step 1120). The received contents are stored in the storage unit 105 of the own server (step 1121). More specifically, the contents are stored as contents 120-A held for the client A (B, C or D). Furthermore, the contents list 130 is updated (step 1122). The contents collection/distribution module 110 transmits the contents information notice 113b to the retrieving server 300 (step 1123). As a result, the fact that the own storage server 100 now holds the new contents is notified to the retrieving server 300.

Subsequently, the contents collection/distribution module 110 distributes the acquired contents to the requesting client 200 (step 1124). The billing information is sent to the billing servers including the service use fee billing server 500 and the contents use fee billing server 600 (step 1125).

Figure 10:
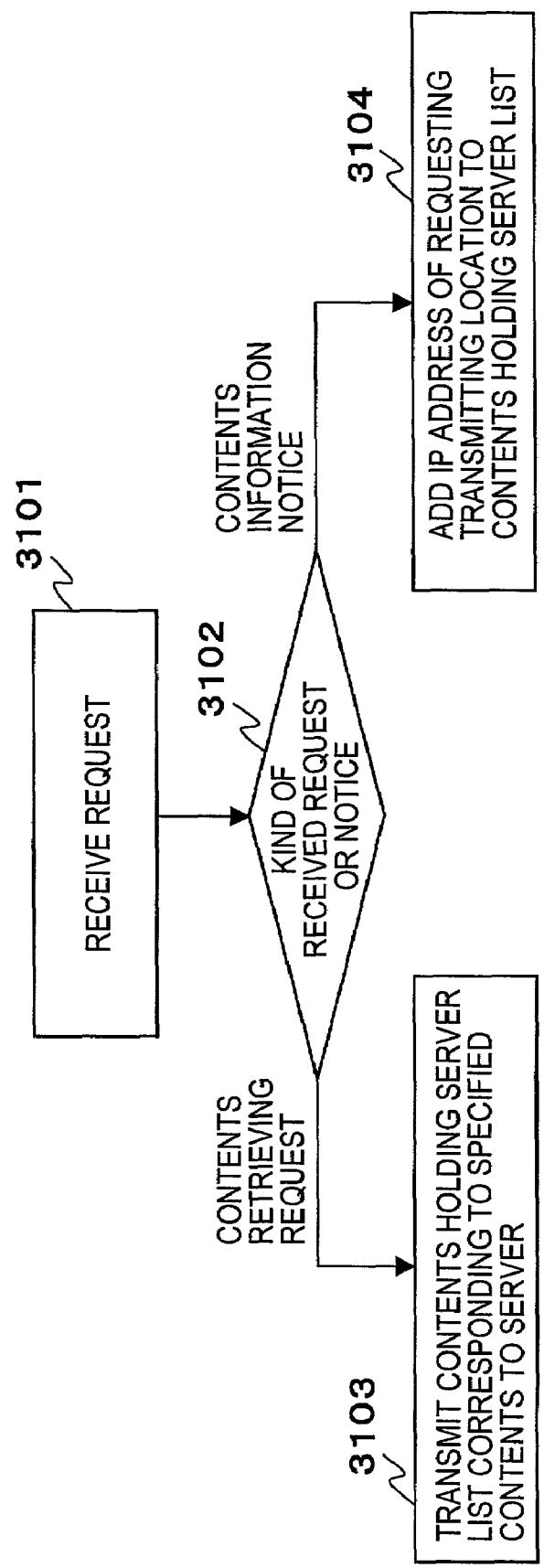
FIG. 10 is a flowchart illustrating the operating procedure of the retrieving module.

FIG. 10 illustrates the operating procedure of the retrieving module 310. The retrieving module 310 starts operation of receiving a contents retrieving request 113a from the storage server 100 or receiving a contents information notice 113b (step 3101). Upon start of operation, the retrieving module 310 determines which of the contents retrieving request 113a and the contents information notice 113b has been received (step 3102). When the contents retrieving request 113a has been received, the retrieving module 310 transmits the contents holding server list 330 corresponding to the specified contents to the requesting storage server 110 (step 3103). When the contents information notice 113b has been received, on the other hand, the IP address of the server transmitting notice is added to the contents holding server list 330 (step 3104).

FIG. 11A illustrates the operating procedure of the service use fee billing server 500. As shown in FIG. 11A, the service use fee billing server 500 receives a billing request 115 from the storage server 100 (step 5101). A fee calculating module 510 calculates a service use fee by use of the billing information sent together with the billing request (step 5102). The module stores the calculated fee into the storage unit 105 of the own server. For the service fee, distribution ratios are determined taking account of contribution of various servers participating in the supply of the service, thereby deciding compensations to the individual servers.

FIG. 11B illustrates the operating procedure of the contents use fee billing server 600. As shown in FIG. 11B, the contents use fee billing server 600 receives a billing request 116 from the storage server 100 (step 6101). A fee calculating module 610 calculates a contents use fee by use of the billing information sent together with the billing request (step 6102). The thus calculated fee is stored in the storage unit 105 of the own server. For the content use fee, distribution ratios are determined taking account of contribution of various servers participating in the supply of the contents, thereby deciding compensations to the individual servers.

In this embodiment, as described above, contents held for the each clients are retained on storage servers kept in the continuous operating state. These contents are collected by use of P2P and successfully distributed. As a result, even in a state in which power of a client is disconnected, it is possible to distribute the contents of that client to the other clients. It is consequently possible to reduce the total amount of network band consumed upon collecting and distributing contents. The contents collection/distribution module located on the storage server takes charge of generation of information necessary for billing the service use fee or the contents use fee. It is therefore possible to certainly accomplish billing while prohibiting manipulation of the operating programs of the modules from the client side.

A second embodiment of the present invention will now be described with reference to FIGS. 12 to 16.

Figure 12:
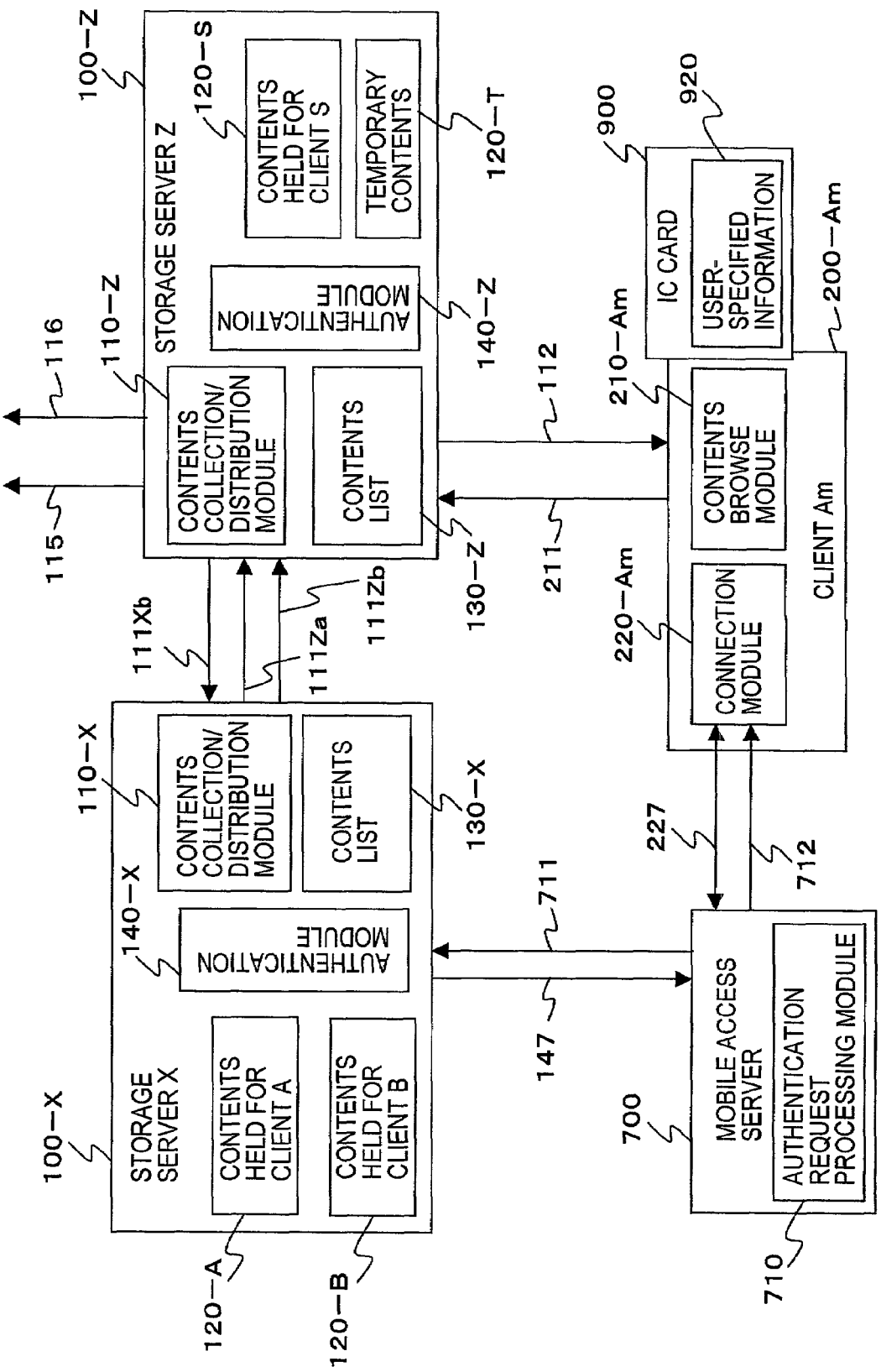
FIG. 12 is a block diagram illustrating the system configuration for contents distribution in a second embodiment.

FIG. 12 illustrates a configuration of the system used in this embodiment. In this embodiment, a client 200-Am capable of receiving an IC card 900 inserted issues a contents distributing request. The client 200-Am usually accesses the storage server 100-X, and contents for own client are stored in the above-mentioned server 100-X. The client 2005 Am is a portable mobile terminal. At the point in time shown in FIG. 12, it is present near a mobile access server 700. Near the mobile access server 700, there exists a storage server 100-Z.

The storage server 100-Z has basically the same configuration as the storage server 100-X. Therefore, it has a contents 120-S held for the client S of the storage server 100-Z. Apart from the above, as the storage server 100-Z serves as a proxy for the distribution function of the storage server 100-X, the storage server 100-Z temporarily stores a contents to be transmitted as temporary contents 120.

The client 200-Am mounts a connection module 220-Am and a contents browse module 210-Am. The connection module 220-Am is authenticated by an authenticating module 140-X on the storage server 100-X via the mobile access server 700. Upon successful authentication, it is possible to receive distribution of a copy of the contents 120-A already held in the storage server 100-X for the own client from the storage server 100-Z (existing near the mobile terminal 200-Am, which is the client).

The operating procedure of the connection module 220-Am, the mobile access server 700, the authentication module 140-X, the contents browse module 210-Am, and the contents collection/distribution module 110 will now be described in detail.

Figure 13:
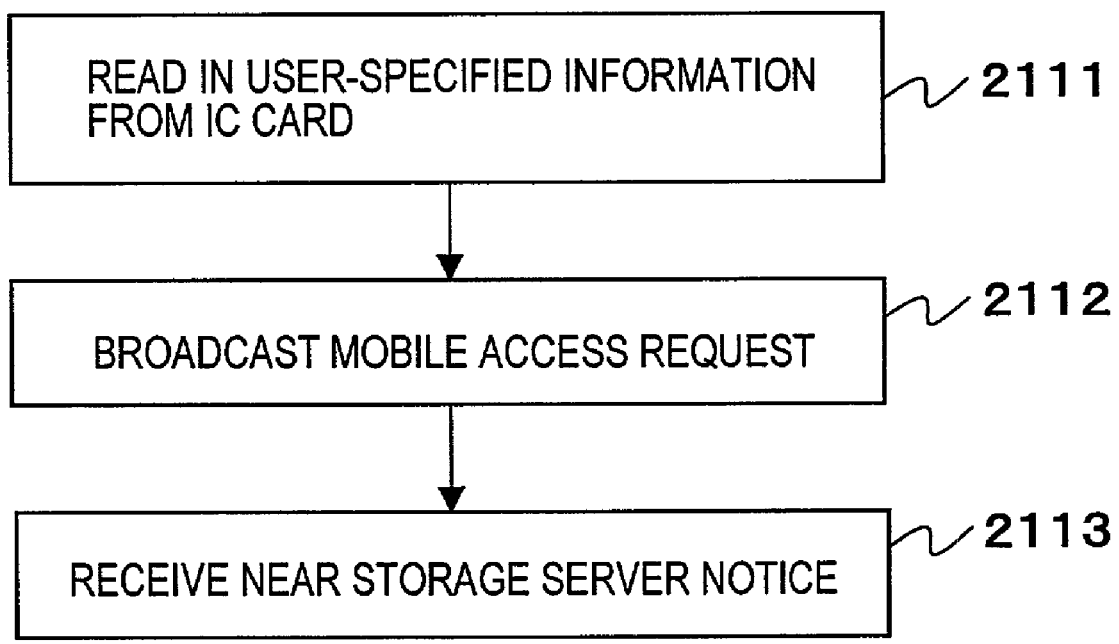
FIG. 13 is a flowchart illustrating the operating procedure of the connection module of the mobile client in the second embodiment.

The operating procedure of the connection module (6001) is illustrated in FIG. 13. The connection module 220-Am reads in user-specified information 920 (information permitting primary identification of a user using the client) stored in the IC card 900 (step 2111). Then, the connection module 220-Am broadcasts a mobile access request 227 to retrieve a nearby mobile access server 700 (step 2112). The request should contain the read-in user-specified information, and the IP address (previously set by the user) of the storage server 100-X holding the contents 120-A for the own client. Then, when there exists the mobile access server 700, the connection module 220-Am receives a nearby storage server notice 712 (step 2113). This notice 712 contains the IP address of a storage server 110-Z existing near the position of the client. This IP address is previously registered in the mobile access server 200-Am.

Figure 14:
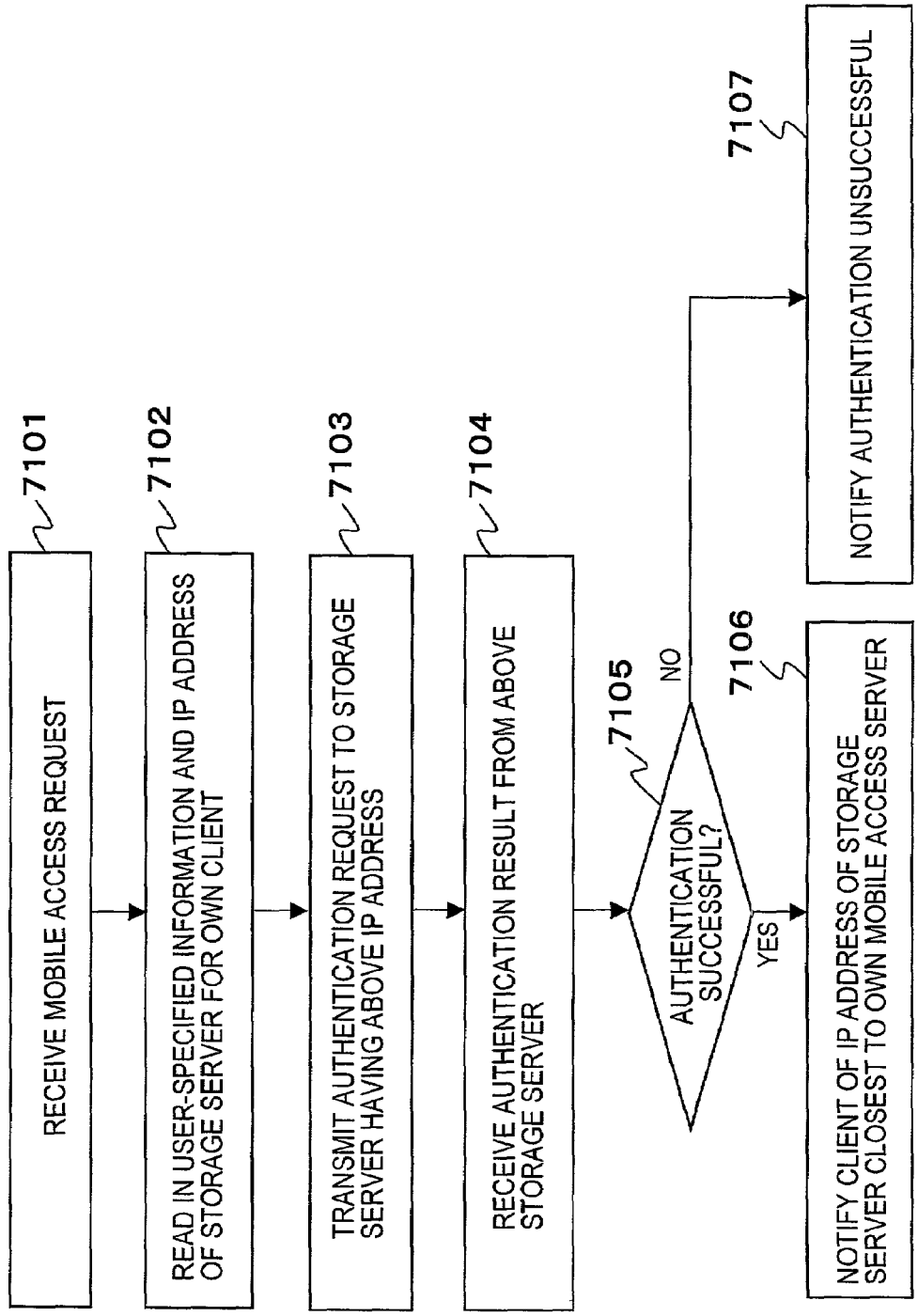
FIG. 14 is a flowchart illustrating the authentication operating procedure of the mobile access module of the mobile access server used in the second embodiment.

The operating procedure of the mobile access server 700 is illustrated in FIG. 14. The mobile access server 700 receives a mobile access request 227 from the client 200-Am and starts operation (step 7101). This request contains, as described above, the user-specified information, and the IP address of the storage server 100-X holding the contents 120-A for the request-issuing client 200-Am. The mobile access server 700 reads in the received use-specified information, and the IP address of the storage server 100-X (step 7102). The mobile access server 700 transmits an authentication request 711 to the storage server 100-X having the above-mentioned IP address (step 7103). This request 711 must contain the aforementioned user-specified information.

The mobile access server 700 receives an authentication result 147 from the above-mentioned storage server 100-X, and determines whether successful or not of the authentication result (step 7105). Only when the authentication is successful, it transmits a nearby storage server notice 712 to notify the client 200-Am of the IP address of the nearby storage server 100-Z registered in the own mobile access server 700 (step 7106). When authentication is unsuccessful, the unsuccessful authentication is notified to the client 200-Am (step 7107).

Figure 15:
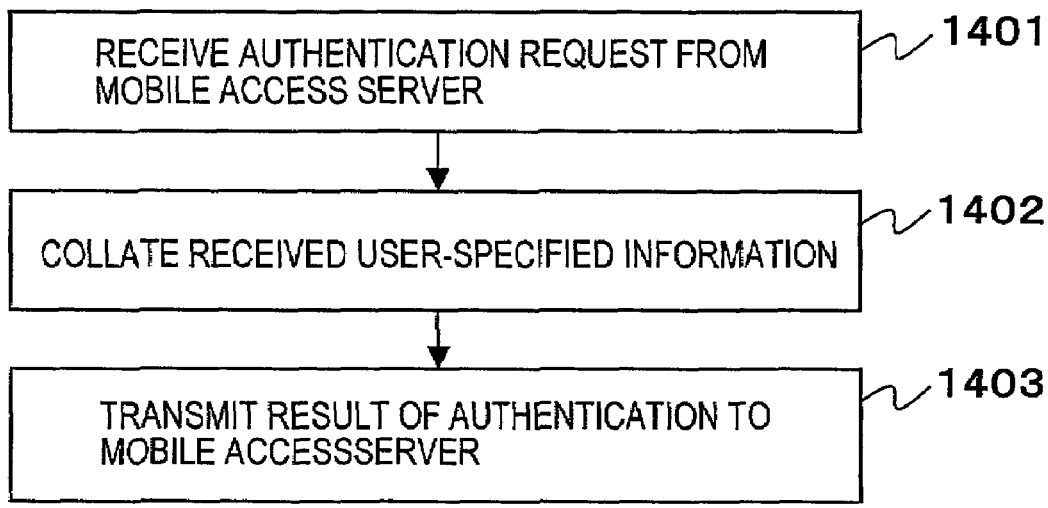
FIG. 15 is a flowchart illustrating the authentication operating procedure by the authentication module of the storage server.

The operating procedure of the authentication module 140 is illustrated in FIG. 15. The authentication module 140 receives an authentication request 711 from the mobile access server 700 (step 1401). This request 711 contains user-specified information. The authentication module 140 checks up whether or not the received specified information is contained in the user-specified information list (previously set in the own server) of an accessible user held by the own storage server 100-X (step 1402). The authentication module 140 notifies the authentication result 147 for notifying "success" if the user-specified information is contained in the list, and "failure" if not to the mobile access server 700 having issued the authentication request (step 1403).

The contents browse module 210-Am mounted on the client 200-Am operates basically in the same manner as the above-mentioned contents browse module 210. However, a storage server storing contents and a storage server receiving distribution of contents may differ for Client 200-Am.

Figure 16:
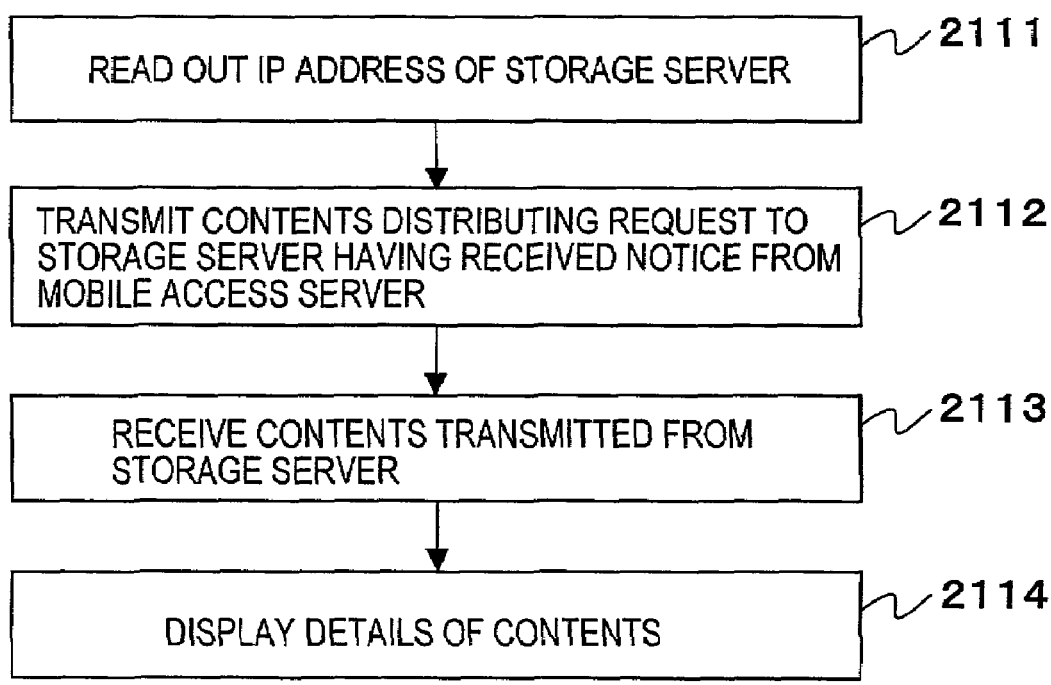
FIG. 16 is a flowchart illustrating the operating procedure of the contents browse module of the mobile client.

FIG. 16 illustrates the operating procedure of the contents browse module 210-Am existing on the client 200-Am. In FIG. 16, the contents browse module 210-Am reads out the IP address of the storage server 100-X holding data for own client (step 2111). As described above, each client is correlated to one storage server. And the user of the client sets the IP address of the storage server. The contents browse module 210-Am transmits a distributing request of contents held, together with the name of contents of which transmission is requested, to the storage server 100-Z having received the notice from the above-mentioned mobile access server 700 (step 2112). At this point in time, the name of contents of which transmission is requested, and the IP address of the storage server holding the contents for the own client are simultaneously transmitted.

The contents browse module 210-Am receives contents held from the storage server 100-Z (step 2113), and displays the received contents at the client 200-Am (step 2114).

Figure 17:
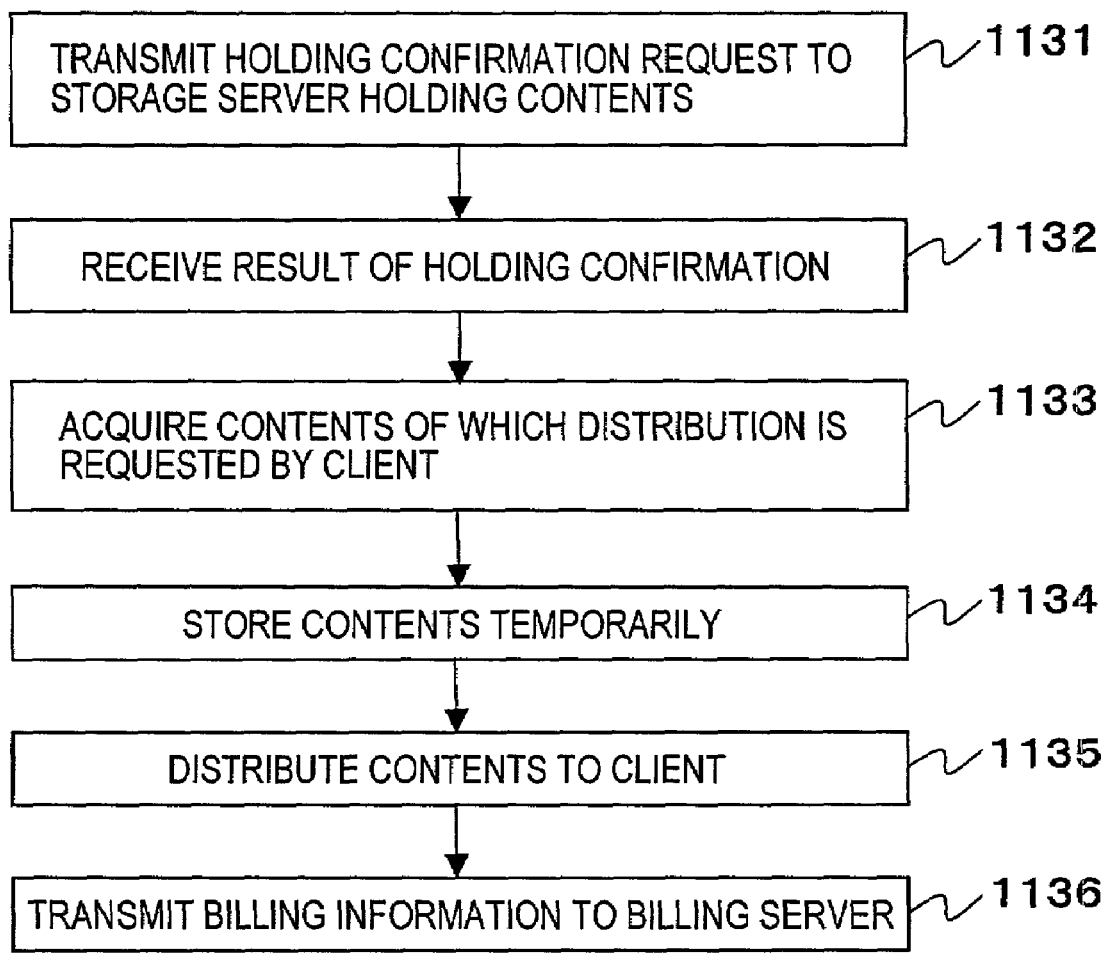
FIG. 17 is a flowchart illustrating the operating procedure of the contents collection/distribution module of the proxy storage server.

FIG. 17 illustrates the operating procedure of the contents collection/distribution module 110-Z on the storage server 100-Z. This contents collection/distribution module 110-Z also, operates in basically the same manner as in the aforementioned contents collection/distribution module 110. In this embodiment, however, it serves temporarily as a proxy storage server 100 conducting contents distribution to the client 200-Am. It is therefore slightly different from contents distribution based on the storage server 100-X in a fixed relationship with the client 200-Am. Functions as a proxy server will be described here.

The content collection/distribution module 110-Z starts operation upon receipt of a distributing request of contents held 211 from the client 200-Am. First, the contents collection/distribution module 110-Z transmits a holding confirmation request 111Xb to the storage server 100-X on the basis of the IP address of the storage server 100-X notified from the client 200-Am (step 1131). This request contains the name of contents of which transmission is requested. When there exist contents requested by the storage server 100-X having received the holding confirmation request, the contents collection/distribution module 110 of the storage server 100-X returns a holding confirmation result 111Za. The contents collection/distribution module 110-Z thus receives the holding confirmation result 111Za (step 1132).

As a result, the contents collection/distribution module 110-Z acquires the contents 111Zb of which distribution is requested by the client from the storage server 100-X in accordance with the same procedure as in the first embodiment, when holding of the contents could be confirmed (step 1133). Further, the storage server 100-Z stores the acquired contents as the temporary contents 120-T (step 1134).

The contents collection/distribution module 100-Z executes contents distribution 112 for distributing the acquired contents to the client 200-Am having transmitted the contents distributing request (step 1135). Billing requests 115 and 116 are also transmitted, together with the billing information, in the same manner as in the aforementioned first embodiment (step 1136). In this embodiment, the storage server 100-Z performs contents distribution in proxy. Fees would therefore be additionally billed for this service in proxy also for the service use fee.

In this embodiment, it is necessary to provide authentication means such as an IC card in the client. The risk of storing the data received from the storage server by the client into the local storage of the own client is eliminated by providing authentication means only on the client not provided with a storage. That is, wrong secondary use of the contents received by the client is avoided.

In this embodiment, data can be received from a nearby storage server, irrespective of the location of the client. Furthermore, this nearby storage server performs collection and distribution of the contents by use of P2P from the nearby position. As a result, it is possible to minimize the total amount of network band consumed for collection and distribution of the contents, irrespective of the location of the client.

This embodiment is based on an assumption that the storage server 100-X holds the contents requested by the client. However, even when the storage server 100-X does not hold the contents requested, the present embodiment can be extended. In this case, upon receipt of a contents holding confirmation request 111Xb from the proxy server, the contents collection/distribution module 110-X of the storage server 100-X temporarily withholds return of the holding confirmation result 111Za. In the same manner as in the above-mentioned first embodiment, information showing the location of the contents is acquired from the retrieving server 300, and the contents is acquired from the other storage server 100-Y holding the contents or the origin server 400 holding the contents. Thereafter, the contents collection/distribution module 110-X transmits the holding confirmation result 111Za to the contents collection/distribution module 110-Z. Thereafter, it is possible to conduct distribution of the contents through processing as described above.

Figure 18:
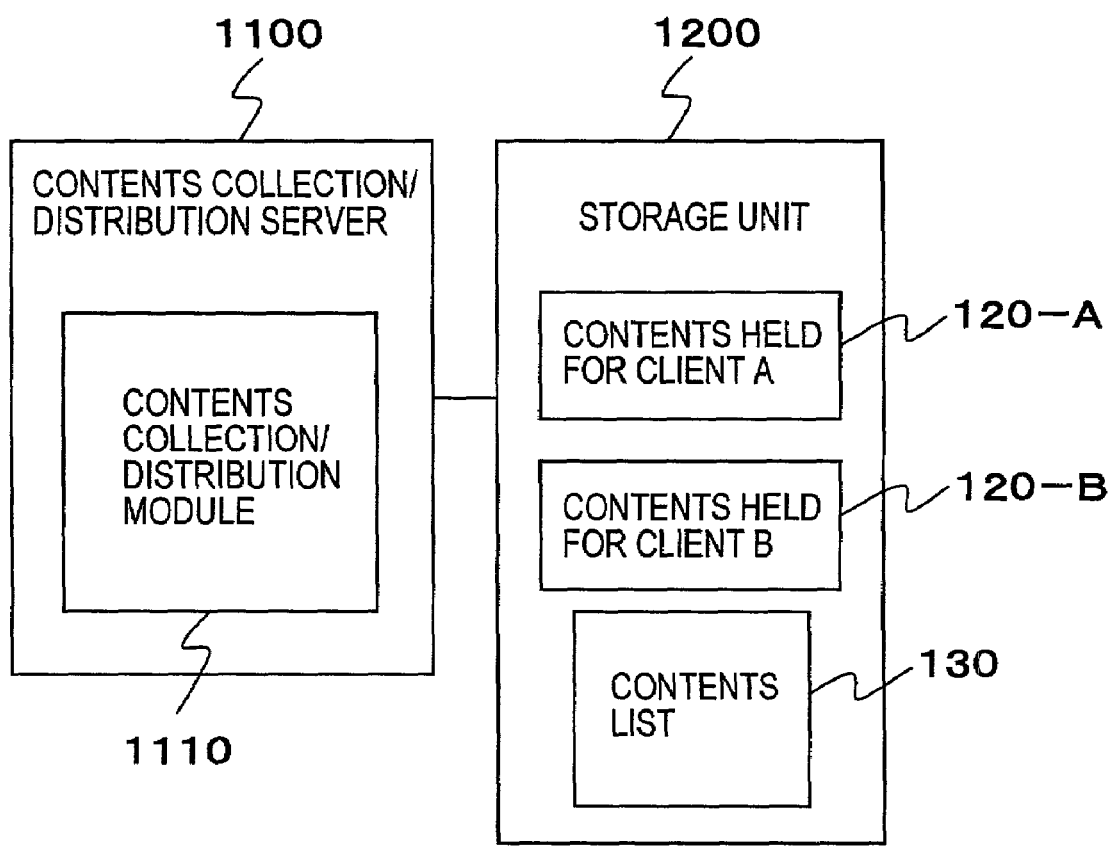
FIG. 18 is a block diagram illustrating the configuration of the contents collection/distribution server and the storage units in a third embodiment.

A third embodiment of the present invention will now be described with reference to FIG. 18. The third embodiment differs from the first embodiment in the configuration of the storage server 100. That is, in this embodiment, the portion corresponding to the storage server 100 in the first embodiment comprises a contents collection/distribution server 1100 and a storage unit 1200 performing collection of the contents and distribution of the contents.

The contents collection/distribution server 1100 has a contents collection/distribution module 1110. The storage unit 1200 has contents 120-A held for client the A, contents 120-B held for the client B and a contents list 130. The contents collection/distribution server 1100 and the storage unit 1200 can be connected via a network such as a LAN or WAN. Collection and distribution of the contents in this embodiment can be carried out in the same manner as the storage server 100 in the above-mentioned first embodiment.

In this embodiment, a plurality of storage units can be connected to a single collection/distribution server 1100.

In each of these embodiments described above, when contents distribution is carried out from a distributing client to a requesting client, it is possible to distribute the contents to the requesting client by the storage server even in a state that power of the distributing client is turned off. As a result, it is possible to reduce the total amount of network band consumed upon collection and distribution of the contents. The contents collection/distribution module existing on the storage server takes charge of generation of information necessary for billing of the service use fee and the contents use fee. The possibility of manipulation of the operating programs for the module on the client side is therefore low, thus making it possible to certainly perform the billing. Furthermore, for the storage unit is independently installed in this embodiment, it is easy to use a plurality of storage unit and addition thereof, thus suitable for a large-scale contents distribution.

What is claimed is:

1. A method for distributing contents, comprising the steps of:
    previously arranging, via a network, a plurality of storage servers, each deployed to connect to said network and each having a storage unit for storing contents and a retrieving server for retrieving a location of the contents stored by each of said storage servers;
    correlating one or more clients to each of said storage servers,
    wherein said one or more clients correlated to one of said storage servers is not the same one or more clients correlated to another of said storage servers;
    causing the storage unit of each of said storage servers to store contents held for a correlated client;
    receiving, in any storage server, a contents distribution request from a client correlated to the storage server;
    distributing said contents to the requesting client when the requested contents exist in said storage server;
    transmitting a request for retrieving a location of the requested contents including a requested content name information to said retrieving server by means of said storage server when the requested contents do not exist in said storage server;
    receiving a content location information including address information of the storage servers holding said requested contents from said retrieving server;
    requesting transmission of said requested contents from any of the storage servers holding said requested contents as shown in a result of retrieval through receipt by the storage server having transmitted said retrieving request of the result of retrieval in the retrieving server;
    storing, upon receipt of the contents, the received contents in the storage unit of said storage server to which the requesting client is correlated, and notifying said retrieving server of holding of said contents in said storage unit of said storage server to which the requesting client is correlated; and distributing said received contents to the requesting client.

2. A contents distributing method according to claim 1, wherein:

collecting, when distributing contents to a client, information for billing a fee for distribution of the contents in the storage server to which said client is correlated.

3. A contents distributing method according to claim 2, comprising the steps of:

arranging, via a network, a service use fee billing server for calculating a use fee of the contents distributing service, and a contents use fee billing server for calculating a use fee of the contents, said service use fee billing server and said contents use fee billing server each deployed to connect to said network; and transmitting information for fee calculation collected in said storage server to said service use fee for billing server and said contents use fee server, together with a billing request for requesting billing of a fee.

4. A contents distributing method according to claim 3, comprising the steps of:

arranging, via a network, an origin server for supplying original contents, wherein said origin server is deployed to connect to said network; and noticing the information specifying the contents held by said origin server and, upon receipt of contents transmitting request from any of storage servers, transmitting said contents from said origin server to a storage server having received said transmitting request, in said origin server.

5. A contents distributing method according to claim 1, comprising the steps of:

arranging an origin server for supplying original contents via a network, and notifying said retrieving server of the contents held by said origin server, wherein said origin server is deployed to connect to said network; and transmitting, when there exist contents distribution-requested by any client in the origin server, the same to a storage server having received the distribution request from a client from said origin server.

6. A contents distributing system for distributing contents, comprising:

a plurality of storage servers arranged via a network, each deployed to connect to said network and each having a storage unit for storing contents;

one or more clients correlated to each of said storage servers; and a retrieving server deployed to connect to said storage servers via the network, wherein said one or more clients previously correlated to one of said storage servers is not the same one or more clients previously correlated to another of said storage servers, wherein said retrieving server has a first computer which stores content location information, and when said retrieving server receives a content retrieving request from one of said storage servers, transmits said stored content location information to said storage server which generates the content retrieving request, wherein each of said storage servers has a storage unit for storing contents held by each client for each of one or more clients previously correlated, and wherein each of said storage servers has a computer for achieving a contents collection/distribution module which, when a contents distributing request from any of said correlated clients is received and said storage server holds the requested contents, distributes the contents to the requesting client, and when said storage server does not hold the requested contents, transmits said content retrieving request to said retrieving server, receives said content location information form said content retrieving server, acquires requested contents from any of storage servers holding the requested contents which are specified by said received content location information, stores the contents in said storage unit of said storage server to which the requesting client is correlated, notifies said retrieving server of holding of the contents in said storage unit of said storage server to which the requesting client is correlated, and distributes said contents to the requesting client.

7. A contents distributing system according to claim 6, wherein:

said contents collection/distribution module collects information for billing a fee resulting from contents distribution, when contents are distributed to a client, in a storage server to which said client is correlated.

8. A contents distributing system according to claim 7, further comprising:

a service fee billing server for calculating a use fee of a contents distribution service; and a contents use fee billing server for calculating a content use fee, wherein said service use fee billing server and said contents use fee billing server receive information for fee billing collected in said storage server, and a fee billing request requesting fee payment, and each has a computer for materializing calculation of said service use fee billing and a fee calculating module presenting the contents use fee billing, respectively.

9. A contents distributing system according to claim 8, wherein said contents collection/distribution module receives a contents distributing request from any of clients not correlated, requests transmission of the requested contents to a storage server to which said client is correlated, and upon receipt of the contents, distributes the received contents to the requesting client.

10. A contents distributing system according to claim 6, wherein said contents collection/distribution module receives a contents distributing request from any of clients not correlated, requests transmission of the requested contents to a storage server to which said client is correlated, and upon receipt of the contents, distributes the received contents to the requesting client.

* * * * *